United States Patent [19]

Curtiss et al.

[11] 4,400,655

[45] Aug. 23, 1983

[54] SELF GENERATIVE VARIABLE SPEED INDUCTION MOTOR DRIVE

[75] Inventors: William P. Curtiss, Winthrop; Gordon P. Sharp, Newton, both of Mass.

[73] Assignee: IMEC Corporation, Boston, Mass.

[21] Appl. No.: 262,742

[22] Filed: May 11, 1981

[51] Int. Cl.³ .............................................. H02P 5/40
[52] U.S. Cl. ................................. 318/729; 318/805; 318/809
[58] Field of Search ............... 318/729, 798, 803, 807, 318/808, 809, 806

[56] References Cited

U.S. PATENT DOCUMENTS

| | | | |
|---|---|---|---|
| 3,619,750 | 11/1971 | Mokrytzki | 318/798 |
| 4,024,444 | 5/1977 | Dewan et al. | 318/227 |
| 4,051,419 | 9/1977 | Takahashi | 318/808 |
| 4,088,935 | 5/1978 | D'Atre et al. | 318/808 |
| 4,158,163 | 6/1979 | Eriksen et al. | 318/798 |
| 4,230,979 | 10/1980 | Espelage et al. | 318/721 |
| 4,249,120 | 2/1981 | Earle | 318/729 |
| 4,291,264 | 9/1981 | Siemon | 318/729 |
| 4,338,559 | 7/1982 | Blaschke et al. | 318/805 |

OTHER PUBLICATIONS

"Inverter Fed Induction Motor Drive Using Power Factor Control" by Rosenberg, Dewan, Slemson; Dept. of EE; Univ. of Toronto; ISA 76 Annual.

"Electronic Analog Slip Calculator for Induction Motor Drives" by Venkataraman, Ramaswami, Holtz; IEEE Transactions on Industrial Electronics and Control Instrumentation, vol. IEC1-27, No. 2, May 1980.

*Primary Examiner*—David Smith, Jr.
*Attorney, Agent, or Firm*—Quarles & Brady

[57] ABSTRACT

An inverter controls an induction motor in response to signals from a power factor control circuit. The power factor control circuit receives signals related to motor terminal voltages and multiplexes them to a comparator. The inverter and multiplexor are sequenced each time the comparator input reaches a reference level. The frequency of the inverter is thus self generated. The power factor of the system can be controlled to implement a variety of control strategies.

26 Claims, 6 Drawing Figures

SELF GENERATIVE VARIABLE SPEED INDUCTION MOTOR DRIVE

BACKGROUND OF THE INVENTION

The field of the invention is variable speed induction motor drives, and particularly, closed-loop, inverter drives for operating induction motors over a wide speed range under varying load conditions.

The speed of an induction motor is controlled by varying the frequency of the power applied to its stator windings. In order to obtain substantially full-load torque capability at all operating speeds it is also necessary to be able to achieve maximum air-gap flux in the motor. In a voltage-source inverter drive, flux is often held near maximum at all times by maintaining a constant motor voltage-to-motor speed ratio, and in a current-source inverter drive, constant flux can be accomplished by maintaining a functional relation between stator current and motor slip speed. Although such control strategies can be simply stated, their economical implementation and efficiencies for many control applications has to date been lacking.

Numerous closed loop control strategies of varying complexity have been proposed to control induction motors. Most of these require the sensing of motor speed, which in turn requires the use of a shaft speed sensor. Such speed sensors add cost and decrease the reliability of the system, at least in the context of industrial motor drives. More recent strategies such as that described in "Inverter Fed Induction Motor Drive Using Power Factor Control" published in the Journal of the 1976 annual meeting of the IEEE Industry Application Society by S. A. Rosenberg, S. B. Dewan and G. R. Slemon avoid the use of tachometers, but a control strategy which relies soley on power factor control is not desirable. For any given power factor, for example, there are two possible electrical frequencies for any given motor speed and the maintenance of one stable solution is not easy under a wide range of operating conditions. Indeed, it is often desirable to operate a motor at or near a maximum power factor point which would not be desirable as a power factor control circuit set point. This is because circuit component values which are out of tolerance could cause unrealizable power factor requirements which may result in an undesirable high slip frequency operation with consequent poor efficiency and torque capability.

SUMMARY OF THE INVENTION

The present invention relates to an induction motor drive system which controls motor flux at various operating points by controlling the phase relationship of the applied current and motor voltage. This is accomplished in part by an inverter which is cycled through its states to apply a.c. current to the motor, a circuit which multiplexes signals related to the motor terminal voltages and applies the resulting signal to a comparator, and a circuit which initiates a state change in the inverter each time the multiplexed signal reaches the comparator reference level. The frequency of the inverter is thus determined by its own output and electronic control of the comparator reference level provides high speed electronic control of the power factor of the system.

A general object of the invention is to enable any of a number of flux control strategies to be easily implemented to enable the motor drive system to be used in a variety of applications. For example, to improve efficiency, it is usually desirable to reduce the flux level when torque loads are low and if dynamic response can be sacrificed. The facility for controlling the power factor, or angle, of the system enables the motor flux operating point to be controlled by varying the comparator reference level with an amplified flux error signal. The error signal may be the difference between a flux command signal and a measured term related to motor flux. The command signal is made equal to a constant ($\phi_o$) plus a term proportional to motor current (KI). The constants $\phi_o$ and K may be selected to provide constant flux operation (K=0) or constant slip operation ($\phi_o$=0) or any combination of the two. Use of a non zero K creates a component of motor flux which is proportional to motor current and which lowers flux during light torque loads to improve efficiency.

Another general object of the invention is to provide a closed loop variable speed induction motor drive system which has maximum torque capability up to base speed without the use of tachometers or other devices for measuring slip frequency. In addition, the use of counters, voltage controlled oscillators and dividers normally associated with other power factor or phase control implementations is avoided by using voltage signal feedback from the motor windings to derive the cyclic waveforms used to sequence the inverter, and hence, control motor speed.

Another object of the invention is to indirectly control the power factor under varying operating conditions without the disadvantages associated with an open loop commanded power factor control strategy. Instead of directly controlling power factor, the commanded flux may be made proportional to motor current to indirectly control power factor such that only one value of positive slip can exist for a given motor flux. The double valued solution with open loop direct power factor control is thus avoided. This control strategy also provides improved operating efficiencies for variable speed induction motor drive systems by reducing the flux level when low output torques are required.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
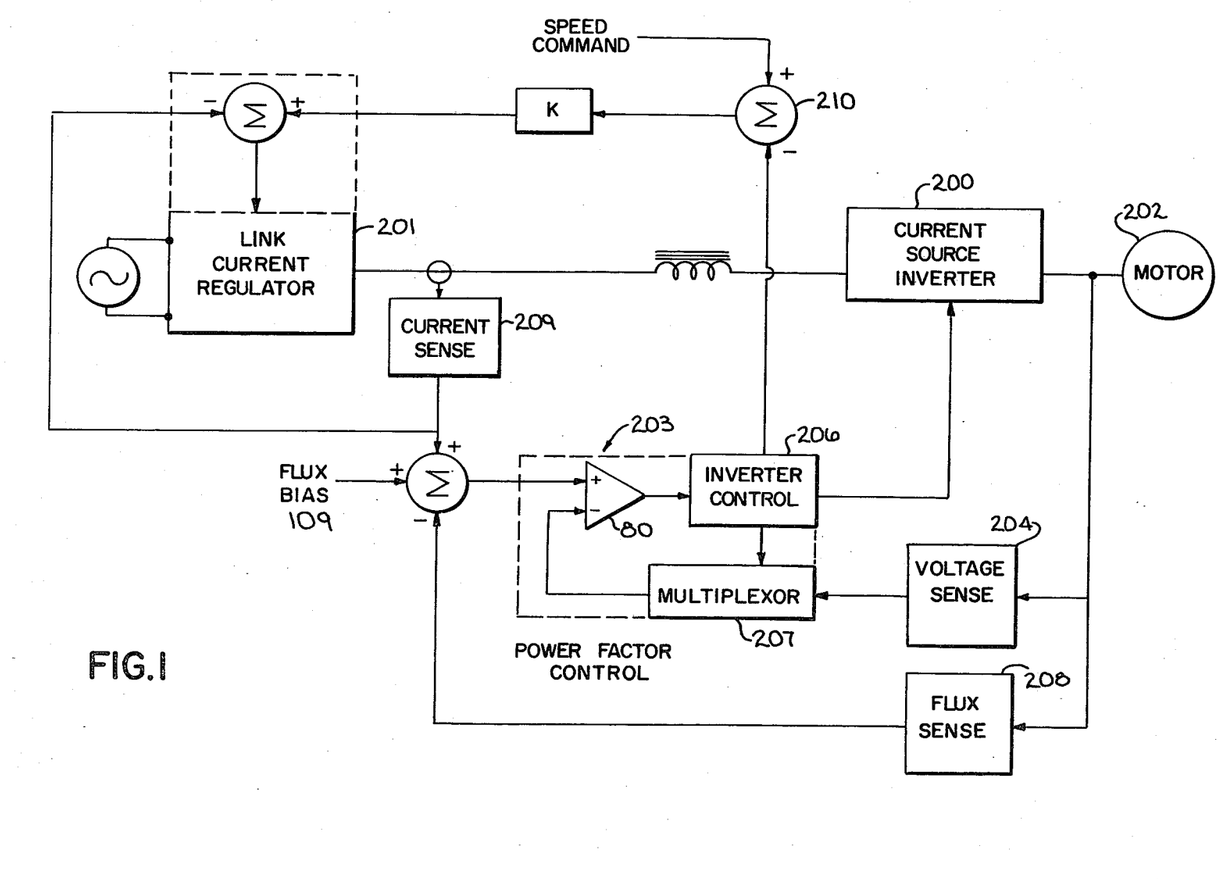
FIG. 1 is a block diagram of the motor drive system of the present invention.
Figure 4:
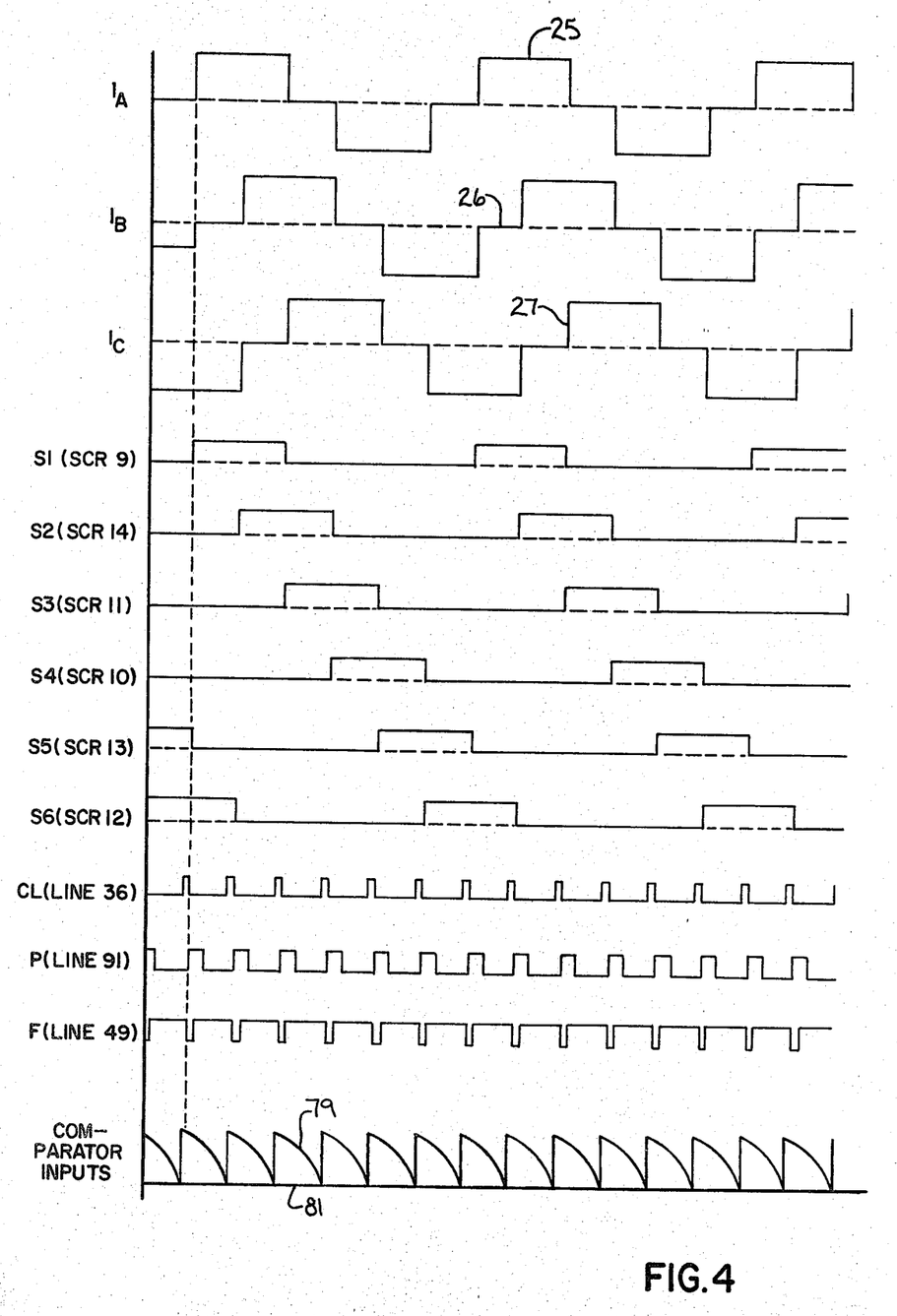
FIG. 4 is a graphic representation of signals which appear at specific points in the system of FIG. 2, and FIGS. 5 and 6 are current wave shapes for alternative embodiments of the invention.

Referring to FIG. 1, a six switch, six step, current source inverter 200 sequentially connects a controlled link current source 201 to alternate terminal pairs of a three terminal three phase motor 202. The technique is characterized by a change in the state of the inverter switches at equally spaced time intervals, with the sequence repeating after six intervals. As shown in FIG. 4, the technique generates a three state current wave shape into each motor terminal, with the wave shapes having 120° phase relationships to each other. These current waveforms together with other influences produce voltage waveforms across the motor stator windings. If the inverter switches are thrown at a fixed angle with respect to the phase of the stator voltage waveforms, then the instantaneous phase of the current and hence power factor of the motor is directly controlled (i.e. the angle between the fundamental of the current and the fundamental of the voltage is controlled).

A power factor control circuit 203 sequences the current source inverter 200 through its states. The timing, or phase, of the switch points is determined by a number of signals input to the circuit 203, including terms related to motor stator winding voltages from the voltage sense circuit 204. Indeed, these cyclic motor voltage signals serve as the primary means for advancing the inverter through its states and the system is thus self regenerative and does not require separate voltage controlled oscillators, counters or dividers.

The power factor control circuit 203 includes a comparator 80 which increments the current source inverter 200 to its next state through an inverter control 206 each time the term relating to cyclic stator winding feedback voltage reaches the commanded reference level. A multiplexer 207 sequences the six signals relating to the three line-to-line stator winding feedback voltages (and their inverses) and applies them to one input of a single comparator 80. The reference level applied to the other input of the comparator 80 serves as a means for altering the power factor.

The power factor or angle between voltage and current is altered to control the motor flux. For example, at any constant link current level, increasing the angle would cause more flux at any operating speed. A signal proportional to motor flux is generated by a flux sense circuit 208 and this is subtracted from a signal proportional to motor current which is generated by circuit 209. A flux bias signal 109 may also be added to allow a finite link current to exist even at light loads. It has been discovered that the connection of the current sense circuit 209 to sense the link current provides a suitable motor current feedback signal under most operating conditions and that separate current sensors directly on the motor stator windings are not required.

Referring still to FIG. 1, a speed control loop is established by deriving a speed signal from the signals used to sequence the current source inverter 200. No tachometers or other mechanical devices are required. The speed signal is subtracted from a speed command signal at summing point 210 and the resulting signal is applied to control the amount of link current applied to the current source inverter 200.

Numerous current, voltage and flux sense circuits are known in the art and although a preferred embodiment of these circuits is described herein, it should be apparent to those skilled in the art that alternative are possible. Also, the multiplexer 207 described herein is a unique circuit which enables the polyphase stator winding voltages to be applied to the single comparator 80. An alternative, but less desirable, arrangement is to eliminate the multiplexer 207 and provide six separate comparators, one for each motor line to line voltage and their inverses. These and other possible variations will become apparent from the following description.

DESCRIPTION OF THE PREFERRED EMBODIMENT

Figure 2:
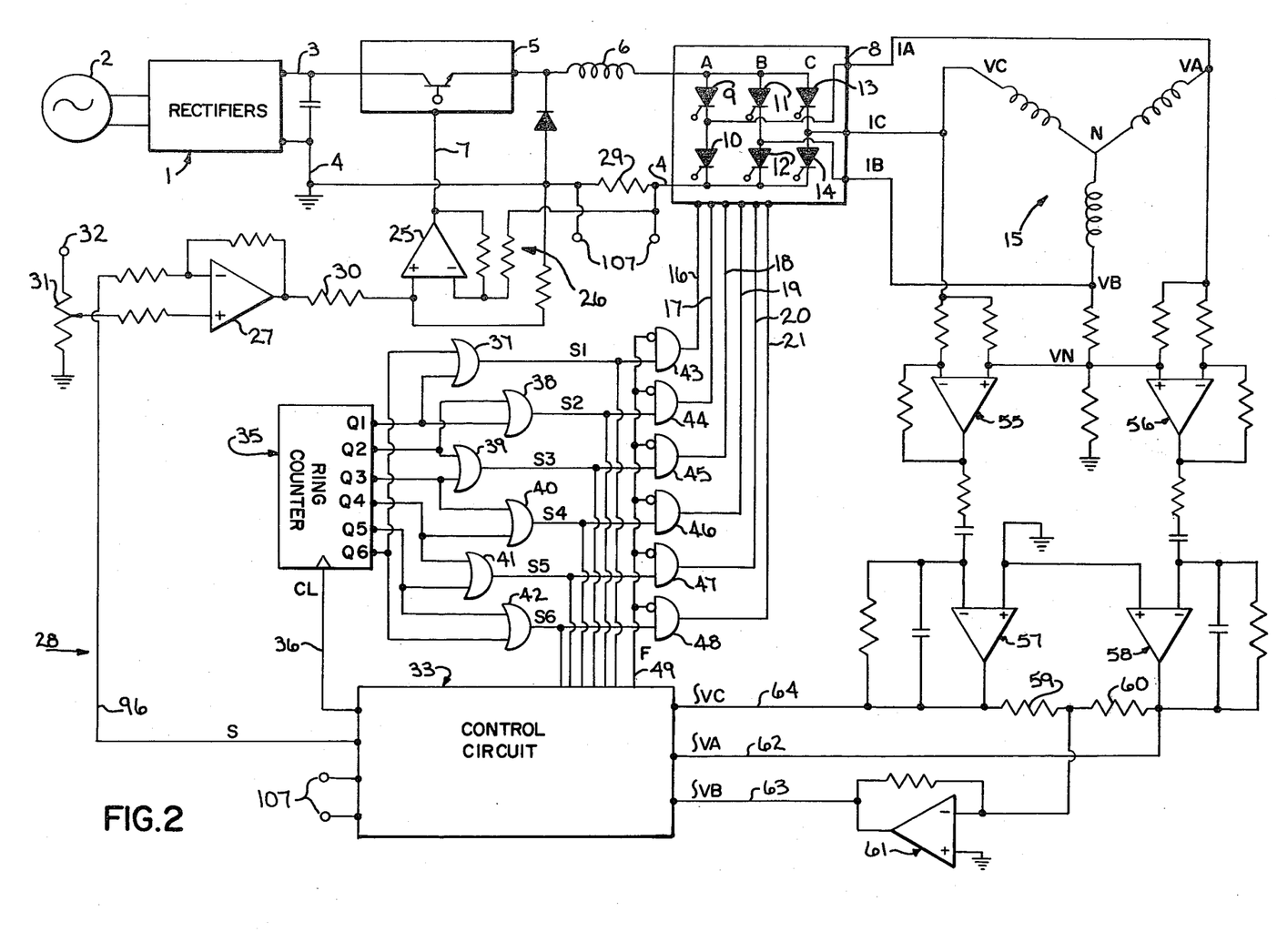
FIG. 2 is an electrical schematic diagram of the motor control circuit of the present invention.

Referring particularly to FIG. 2, the motor control of the present invention includes a full wave rectifier circuit 1 which connects to a source of a.c. power 2 and which delivers rectified voltage to a positive d.c. bus 3 and a return d.c. bus 4. A voltage modulator circuit 5 connects to the positive d.c. bus 3 and it operates within a local current feedback loop to control the amount of current flowing through an inductor 6 to an inverter circuit 8. The modulator circuit 5 operates in response to a signal on a control line 7 and it should be apparent to those skilled in the art that numerous alternatives for controlling the current applied to an inverter are available.

Referring to FIG. 2, the inverter circuit 8 is a three-phase SCR current source inverter which includes six silicon-controlled rectifiers 9-14. The SCRs 9, 11 and 13 are triggered into conduction to steer the link current into one of the respective stator winding terminals VA, VB and VC of the induction motor 15. The SCRs 10, 12 and 14 are triggered into conduction to provide a return path for this current from another terminal. The SCRs 9-14 are sequentially fired and commutated in response to signals on six control lines 16-21 to sequentially connect alternate stator terminal pairs on the motor 15 to the current source. This well known six step current source inverter technique applies three phase-duplicated alternating current waveforms to the stator windings which produce a rotating magnetic field in the motor. These current waveforms are indicated at 25, 26 and 27 in FIG. 4.

The principles of operation and the circuit details of the inverter circuit 8 and the current control circuit 201 are well known in the art. The rate at which the SCRs 9-14 are sequenced through the six steps determine the frequency of the current waveforms 25-27, and the amount of d.c. "link" current delivered to the inverter 8 determines the magnitude of these waveforms. The present invention employs a unique technique for operating the motor 15 over a wide speed range by controlling these and other variables.

Referring particularly to FIG. 2, the voltage modulator input line 7 is driven by an operational amplifier 25 which forms part of a current control loop 26. The current control loop 26 is in turn driven by an operational amplifier 27 which forms part of an outer speed control loop 28. The operational amplifier 25 has its inputs connected to receive a current feedback signal generated across a resistor 29, and this signal is summed with a current command signal generated by operational amplifier 27 through coupling resistor 30. The operational amplifier 25 thus operates to control the amount of current flowing in the d.c. buses 3 and 4 by driving the voltage modulator circuit 5 to an operating point which balances the current feedback signal and the current command signal applied to its inputs.

The magnitude of the current command signal generated by operational amplifier 27 is determined by summing a speed command signal and a speed feedback signal applied to its inputs. The speed command signal is generated by a potentiometer 31 which controls the amount of voltage from a positive d.c. supply terminal 32 to the noninverting input of amplifier 27. The potentiometer 31 may be manually set or a voltage may be introduced at this point to command the desired motor speed. The speed feedback signal is applied to the inverting input amplifier 27 by a control circuit 33 which will be described in detail below.

The operational amplifier 27 generates a current command signal to the current loop 26 which causes the speed command signal and the motor speed feedback signal to balance at a stable operating point. For example, if the load on the motor 15 should increase, its rotor begins to slow and the speed feedback signal drops. This results in an increased current command signal from the amplifier 27 which in turn increases the current applied to the motor stator windings. The minor flux control loop either holds flux constant or increases flux according to the selection of the constants Oo and K. This always results in increased torque to meet the increasing load and to prevent the motor speed from dropping. Also, a change in the commanded speed will cause a corresponding change in the output of amplifier 27, and this in turn will change the motor stator current. As will be described in more detail below, this change in stator current also increases torque which would increase speed and the power factor control circuit 33 responds to this by automatically changing the sequential firing rate of the inverter 8 and hence changes the electrical frequency.

Referring particularly to FIGS. 2 and 4, the firing signals for the SCRs 9-14 in the inverter circuit 8 emanate from a six stage ring counter 35. The ring counter 35 is driven by a clock signal CL on a control line 36, and with each clock pulse, a logic high is shifted to the next output Q1-Q6 on the ring counter 35. The ring counter 35 is cycled once for each set of six clock pulses CL and six OR gates 37-42 are successively enabled to generate respective 120° wide control signals S1, S2, S3, S4, S5 and S6. These control signals are applied to respective AND gates 43-48 which are in turn enabled by a firing signal F generated on a common control line 49. The outputs of the AND gates 43-48 drive the respective inverter control lines 16-21 to sequentially apply firing pulses which trigger and commutate the SCRs 9-14.

Referring particularly to FIG. 4, if the pulses CL on the control line 36 increase in frequency, the ring counter 35 is cycled faster, the frequency of the six step control signals S1-S6 increases and the firing rate of the inverter SCRs 9-14 is increased. The respective SCRs 9-14 are actually fired a short time after the corresponding control signals S1, S4, S3, S6, S5, S2 change state. The firing pulses F on the control line 49 provide the precise synchronization.

The frequency of the pulses CL and the timing of the firing pulses F are determined by the control circuit 33 which receives feedback information from the motor 15. Referring particularly to FIG. 2, the voltage waveforms at the stator winding terminals VA, VB and VC are applied to a pair of operational amplifiers 55 and 56 and are then integrated by circuits which include operational amplifiers 57 and 58. The voltage waveform at terminal VB is actually summed with the other two waveforms VA and VC to create an artificial neutral, and thus the integrators 57 and 58 are operating on the line to neutral voltages. The integral of waveform VB is artificially obtained by inverting the sum of the outputs of the integrators 57 and 58 using a pair of resistors 59 and 60 and an operational amplifier 61. The integral of the voltage waveforms VA, VB and VC are thus generated and applied as feedback signals to the control circuit 33 through respective control lines 62, 63 and 64. It should be apparent that numerous circuits for sensing the voltage waveforms VA, VB and VC may be employed in place of that disclosed herein. The integration step is preferable, however, because it does smooth the otherwise "corrupted" waveform and the resulting ninety degree phase shift can be easily accounted for in subsequent circuitry.

Figure 3:
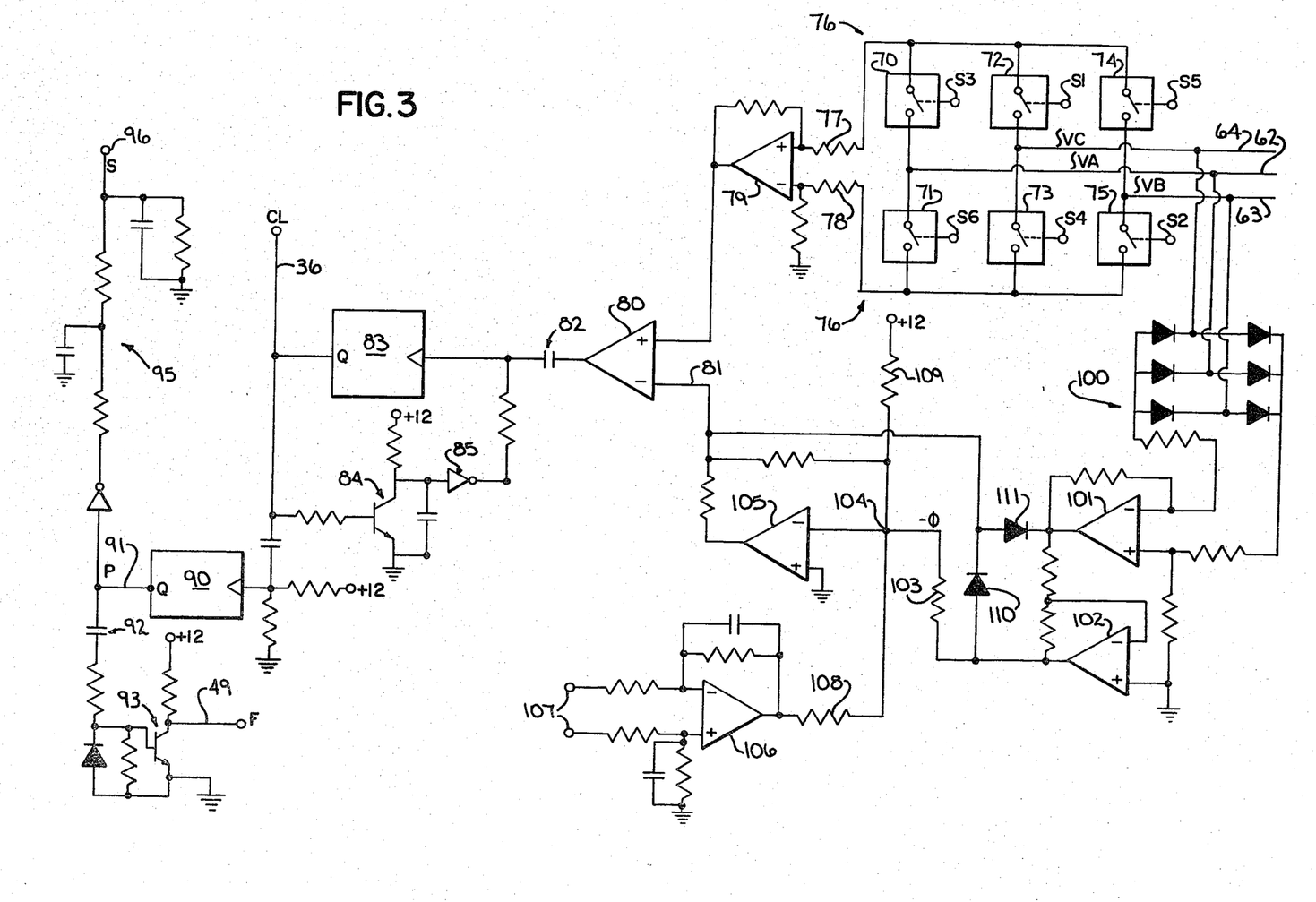
FIG. 3 is an electrical schematic diagram of the control circuit which forms part of the system of FIG. 2.

Referring particularly to FIG. 3, although there are a number of techniques for processing the integrated stator voltage waveforms to control the phase at which the inverter 8 is sequenced, a relatively simple and direct technique is employed in the preferred embodiment of the invention. This technique employs a set of six signal level, bilateral switches 70-75 which are configured and sequentially driven in a manner similar to the current source inverter switches. The switches 70-75 operate as a multiplexer whose output is indicated generally by line pair 76 feeding the differencing operational amplifier 79. The bilateral switches 70-75 are controlled by the same signals S1-S6 which drive the inverter circuit 8 and they serve to sample the line to line integrated stator voltage waveforms between VA, VB and VC in synchronism and in the same sequence as the SCR "on" intervals of the inverter circuit 8. However, the multiplexer drive timing signals are phase displaced by 120° (lagging) to account for the integrator lag and still provide a good operating point for comparator 80. Alternately, line-to-neutral signals and their complements utilizing appropriate nonoverlapping 60° wide switch "on" signals from ring counter 35 (Q1, Q2. . .Q6) rather than overlapping 120° switch "on" intervals represented by signals S1-S6, could also be chosen as inputs to the comparator 80. This would result in a different steady state comparator input waveshape to account for the 30° shift between line-to-line and line-to-neutral signals. The choice between techniques allows the operating range to be placed in the best (linear) portion of the sinewave to obtain the sharpest comparisons, to linearize the response and to avoid the peaks. Indeed, since it is well known that arbitrary frequency independent phase shifts can be created by appropriate sum and differencing of weighted amplitudes of three-phase signals, the cyclic waveform can be created at any desired phase.

The integrated line to line output of differencing operational amplifier 79 is applied to one input of an operational amplifier 80 which operates to compare the magnitude of the multiplexed waveform with a composite reference voltage on a line 81. When the multiplexed waveform goes below the composite reference voltage, the output of amplifier 80 swings negative and it generates a voltage pulse through a capacitor 82 to the trigger input of a monostable multivibrator 83. The monostable multivibrator 83 produces a commutation pulse on the CL control line 36 each time such a voltage pulse is applied to its input to sequence the ring counter 35 and to thus self generate frequency. The level appearing on line 81 controls the angle between current and voltage and it thus determines the shape of the multiplexed waveform. Unlike prior systems, there is no need for a separate voltage-controlled oscillator with associated counters or dividers since the operation of the motor voltages serve to provide the cyclic signals used to control the firing of the inverter circuit 8. A retriggerable low frequency oscillator is formed by an RC network at the collector of transistor 84 and inverter gate 85. The gate operates as a threshold detector which triggers the monostable multivibrator 83 which in turn resets the RC network via transistor 84. The system is thus "seeded" with low frequency pulses during start up. When the pulse rate from the comparator 80 exceeds that produced by the low frequency oscillator, the latter is effectively removed from the circuit.

The clock pulses CL generated by the monostable multivibrator 83 are also employed to derive the firing signal F and the speed feedback signal S. Referring particularly to FIGS. 3 and 4, the clock pulses CL are applied to the trigger input of a second monostable multivibrator 90 which generates pulses P on a line 91. Each pulse P is coupled through a capacitor 92 to provide momentary base current to a transistor 93 and to thereby produce a logic low firing pulse F on the line 49. As explained above, the firing signal F gates pulses through one of the enabled AND gates 43–48 to trigger the proper SCR and commutate the adjacent conducting SCR.

The pulses P generated by the monostable multivibrator 90 are "constant area" pulses which are also employed to produce the analog speed feedback signal S. This is accomplished by a filter network 95 comprised of a pair of resistor-capacitor filters. The resulting speed feedback signal S has a magnitude which is proportional to the rate at which the pulses P are generated, and hence to the stator voltage frequency. Since slip frequency is usually small and reasonably constant if flux is made proportional to link current, feedback signal S can provide an accurate indication of mechanical frequency. As shown in FIG. 2, the speed feedback signal S is generated through a control line 96 to the operational amplifier 27 to close the speed control loop 28.

Referring particularly to FIG. 3, the timing of the pulse generated by the comparator 80, and hence the frequency of the resulting pulse train, is determined by the magnitude of the reference signal on the line 81. This reference signal provides a means for varying the power factor at which the motor 15 operates and it also provide the means for implementing a control strategy. The control strategy of the preferred embodiment of the invention is to make motor flux equal to a constant plus a term proportional to motor current. This is achieved by varying the power factor at which the motor operates through the control line 81. If the flux bias ($\phi$o) is set near zero, the power factor also tends to remain constant over varying loads.

To implement this strategy a signal proportional to motor air gap flux is obtained by rectifying and summing the three integrated stator voltage waveforms VA, VB and VC. This is accomplished by a full wave bridge rectifier circuit 100 which connects to the respective control lines 62–65 and which drives a pair of operational amplifiers 101 and 102. The amplifier 101 operates as a voltage divider to reduce the magnitude of the resulting flux signal and the amplifier 102 operates as an inverter having a gain of one. The resulting flux signal ($-\phi$) is coupled through a resistor 103 to a summing point 104 at the input of an operational amplifier 105.

The flux signal ($-\phi$) is summed with a signal proportional to motor stator current. The stator current signal is generated by an operational amplifier 106 which has its inputs connected across the resistor 29 in the d.c. bus 4 by leads 107. A resistor 108 connects the output of amplifier 106 to the summing point 104. In addition, a resistor 109 connects the summing point 104 to a d.c. supply terminal to enable a bias flux signal to be injected. This bias flux signal effectively increases the flux to current ratio at low flux levels which is useful as it allows a finite link current to exist even at low torque levels.

The desired flux is maintained under varying speed and load requirements by controlling the power factor at which the motor 15 is operated. When the flux is less than the commanded amount, a negative error signal is output by the amplifier 105 to the comparator 80. The negative signal delays the generation of firing pulses to the inverter circuit 8 to thereby instantaneously decrease the power factor. For any given link current this results in an increase in air gap flux. On the other hand, if the flux is greater than the commanded amount, the composite reference signal on line 81 increases and the firing of the inverter circuit 8 is advanced to reduce the reactive current for any given link current and to thus reduce motor flux.

Referring again to FIG. 3, the reference signal output of the amplifier 105 must not exceed the peak level of the cyclic waveform applied to the comparator 80 by the multiplexer 76. This is insured by a pair of clamping diodes 110 and 111 which connect the control line 81 to the outputs of amplifiers 101 and 102. The diodes limit the voltage on line 81 to a value less than the peak value of the integrated stator voltage waveforms which appear at the input to amplfier 101.

It should be apparent that the reference signal applied to the comparator 80 may include other components which enable the system to implement numerous control strategies. It has been found, however, that the motor current component is particularly useful in maximizing efficiency under a wide variety of operating conditions.

An alternate embodiment of the invention which comprises a d.c. voltage bus feeding a voltage source inverter may also be implemented. In such an embodiment, the motor currents are sensed and employed to provide feedback control of the individual phase currents. More specifically, the error (current) signals generated by respectively subtracting these feedback currents from the quasi sinusoidal current command inputs are used as the inputs to a pulse width, hysteresis or other type of modulator circuit that controls each phase of the voltage source inverter.

Although the cyclic feedback signal created in the current source inverter embodiment of the invention creates 60° sinewave segments, in the d.c. voltage link embodiment, variations are possible. Integration of the terminal voltages in a three phase system creates sinusoidal type waveshapes at 120° angles to each other, which together with the negatives of these waveshapes creates a set of sinewaves at every 60°. Additional sinewaves phased equidistant between these signals are easily created for example by summing each adjacent pair and applying a weighting factor of $1/\sqrt{3}$ to achieve equal amplitudes. This results in a set of twelve sinewave segments equidistantly phased. In an analogous manner, any set in the sequence 6, 12, 24, 48 . . . could be created using this technique. An analogous procedure can also apply to 2 phase systems wherein the sequence 4, 8, 16, 32 . . . is easily created.

This can be generalized as follows. First assume an ordered set (n) of these equidistantly distributed sinewaves which are sampled by an n channel multiplexer and fed to a comparator. The comparator sequentially compares each of the members of the ordered set to a reference level and when intersection with the reference level occurs, the multiplexer is sequenced to its next state and the multiphase stator current command signals are changed so as to shift the stator flux direction by approximately 360/n electrical degrees independent of stator amplitude commands. With this procedure, the stator field is rotated automatically and thus the stator excitation frequency is self generated.

One method for creating the discrete, phase shifted, but amplitude controllable, multiphase current command signals is to sequentially switch among a set of attenuated versions of the variable stator amplitude d.c. command level. The attenuator ratios and switching sequence is selected to create discrete level, "box car" type approximations to the multiphase sinewaves. The boxcar type sinusoidal approximations have relative discrete amplitude levels corresponding to sample and hold versions of equal amplitude three phase sinusoidal waveshapes. Thus through judicious use of symmetry and the use of inverting amplifiers, it is possible to minimize the number of discrete amplitude levels and thus the number of attenuators required.

Figure 5:
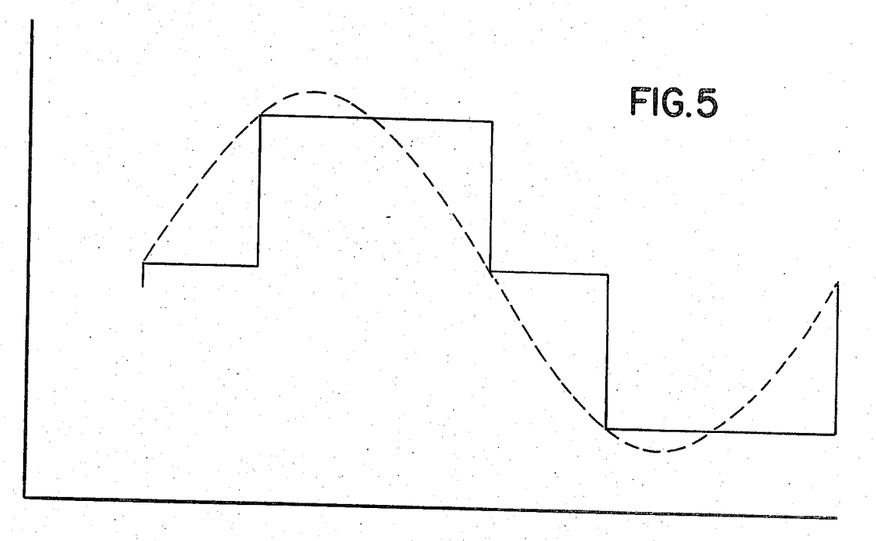

For example with n=6 and applying symmetry to minimize the number of levels, one of the synthesized current command waveshapes would appear as in FIG. 5. In this situation no attenuators are required. The waveshape for the current command with this constraint comes out identical to what the standard current mode inverter generates.

Figure 6:
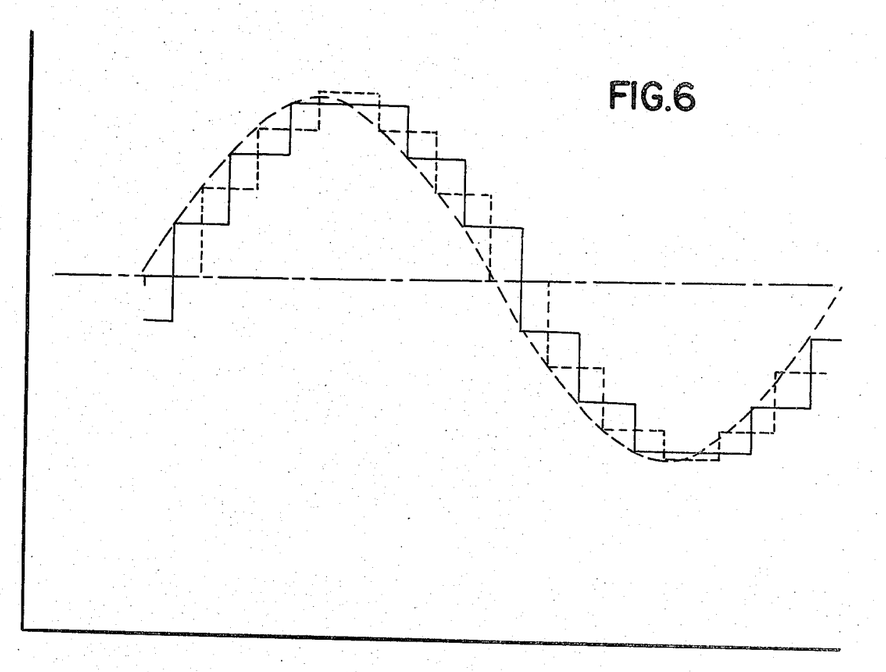

For n=12 and proper use of symmetry, only 2 attenuators are needed and two waveshapes which meet this requirement are superimposed in FIG. 6.

Variation of the comparator reference level also varies the instantaneous power factor as in the earlier embodiment. With the substitution of direct stator current amplitude measurement, for example with a full wave bridge, for the previous link current measurement, all other features encompassed in the other embodiment can analogously be achieved. For example the outer loop frequency control, flux sensing and control, start up etc. can all be achieved in the same way. In some applications, direct measurement of the stator amplitudes is not required as the amplitude command signal is adequate.

In the preferred embodiment of the invention, a multiplexer and a single comparator are employed to create signals for discretely incrementing the stator phase. As should be obvious to one skilled in the art, multiple comparators could also be used in place of the single comparator to avoid the use of multiplexing. In this multiple comparator version, the variable reference level would feed one terminal of all the comparators and suitable circuitry would be incorporated to sequence to the next discrete stator phase position when any comparator senses a unidirectional threshold crossing. With the multiple comparator configuration, hysteresis (possibly time variable) or another masking technique should be included to avoid multiple comparator crossings due to noise.

We claim:

1. An induction motor drive which comprises:
   an inverter having outputs connected to the stator windings of the motor to be controlled, the inverter being operable in response to command signals to apply an alternating current to each of said motor windings;
   voltage sensing means coupled to said motor stator windings and being operable to generate quasi sinusoidal feedback signals related to the phase of the stator winding voltages;
   power factor control means connected to receive the feedback signals and being operable in response thereto to generate command signals to said inverter which control the phase of the alternating currents the inverter applies to each of said motor windings;
   means for sensing the magnitude of the stator winding current and generating a signal proportional thereto;
   means for sensing the magnitude of the magnetic flux generated by the motor stator windings and generating a signal proportional thereto; and
   power factor selection means connected to receive said stator winding current signal and said magnetic flux signal and being operable in response thereto to select the power factor operating point of said power factor control means such that the magnetic flux signal is controlled as a function of said stator winding current signal.

2. The induction motor drive as recited in claim 1 which includes means for controlling the speed of the motor that comprises:
   current control means coupled to the inverter for controlling the amount of current provided by the inverter in response to a current amplitude command signal; and
   means for generating a current amplitude command signal which reflects the speed error from which the motor is to operate.

3. The induction motor drive as recited in claim 2 in which motor electrical frequency sensing means couples to said current amplitude command signal generating means to form a frequency feedback loop in which a frequency error signal is generated to effect the magnitude of said current command signal.

4. The induction motor drive as recited in claim 1 in which said voltage sensing means includes integrator means for integrating motor stator winding voltage.

5. The induction motor drive as recited in claim 1 in which said power factor control means includes:
   multiplexer means for successively sampling the feedback signal from said voltage sensing means in synchronism with the discrete phase advances of the alternating current applied to the motor windings by the inverter and generating a multiplexed waveform; and
   comparator means coupled to the multiplexer means and being operable to generate a discrete phase advance signal when the magnitude of the multiplexed waveform reaches the magnitude of a composite reference signal that is indicative of the power factor at which the motor is to operate.

6. The induction motor as recited in claim 1 in which said means for sensing the magnetic flux includes means for sensing the voltage across each stator winding, means for integrating the sensed stator winding voltages, and means for rectifying and summing the rectified integrated stator winding voltages.

7. An induction motor drive which comprises:
   an inverter connected to receive direct current and generate alternating current waveforms for application to the stator windings of an induction motor, the frequency of the current waveforms being determined by the frequency of firing pulses applied to the inverter;

voltage sensing means coupled to said motor stator windings and being operable to generate a cyclic feedback signal which has a frequency related to motor speed; and pulse generation means coupled to receive the cyclic feedback signal, and in response thereto, generate firing pulses to said inverter.

8. The induction motor drive as recited in claim 7 in which the pulse generation means includes a low frequency oscillator for producing firing pulses below a predetermined electrical frequency on the stator windings.

9. The induction motor drive as recited in claim 7 which includes;

a current control circuit connected to the inverter to control the magnitude of the direct current supplied thereto in response to a command signal; and command signal generation means including means for generating a selectable speed command signal, means coupled to receive the firing pulses and generate a frequency feedback signal indicative of motor speed, and means for summing the speed command signal and the speed feedback signal to generate said command signal.

10. The induction motor drive as recited in claim 7 in which said pulse generation means includes a comparator which connects to receive said cyclic feedback signal and a composite reference signal, and the phase of the generated firing pulses is altered by the level of the composite reference signal.

11. The induction motor drive as recited in claim 10 which includes:

means coupled to the motor for sensing the magnetic flux coupled into the stator windings;

means coupled to the motor for sensing the magnitude of the current flowing in its stator windings; and means for generating said composite reference signal which is responsive to the difference of the sensed magnetic flux and the sensed stator winding current.

12. An induction motor drive which comprises:

current regulator means for providing direct current to a d.c. bus in response to a current command signal;

a current source inverter connected to the d.c. bus and being operable to generate alternating current waveforms for application to the stator windings of an induction motor, the frequency of the current waveforms being determined by the frequency of firing pulses applied to the inverter;

power factor control means for generating firing pulses to the current source inverter which maintain the power factor of the electric power applied to the induction motor at a determined operating level; and means for determining the power factor operating level including means for sensing the magnitude of motor flux and determining the power factor operating level in response thereto.

13. The induction motor drive as recited in claim 12 in which said means for determining the power factor operating level also includes means for sensing the magnitude of motor stator winding current and determining the power factor operating level in response thereto.

14. The induction motor drive as recited in claim 13 in which said means for sensing the magnitude of motor stator winding current includes means coupled to the d.c. bus for measuring the magnitude of the current flowing therethrough.

15. The induction motor drive as recited in claim 12 which includes means for generating a current command signal which is determined by the magnitude of a speed command signal and the magnitude of a speed feedback signal, and means for generating a speed feedback signal indicative of motor speed.

16. An induction motor drive which comprises:

a current source inverter connected to receive direct current from a d.c. link and generate a balanced three phase set of tri-state alternating current waveforms for application to the stator windings of an induction motor in order to produce discrete phase advances of the stator flux field, the frequency and sequencing of the waveforms being determined by phase advance command pulses applied to the inverter;

voltage sensing means coupled to said motor stator windings and being operable to generate substantially sinusoidal feedback signals related in both frequency and phase to the stator winding voltages;

power factor control means connected to receive said sinusoidal feedback signals and being operable in response thereto to generate phase advance command pulses to said inverter which control the phase shift of the alternating currents applied to the motor stator windings with respect to the stator voltages, in order to maintain the power factor of the electric power applied to the induction motor at a commanded level;

means for generating a power factor command which reflects the magnetic flux error from which the motor is to operate;

link current regulator means for providing direct current to the d.c. link in response to a current amplitude command; and means for generating a current amplitude command for the link current regulator means which reflects the speed error from which the motor is to operate.

17. The induction motor drive as recited in claim 16 in which said voltage sensing means includes integrator means for integrating the stator winding voltages and producing substantially sinusoidal feedback signals related to the stator voltages by a fixed 90° phase shift.

18. The induction motor drive recited in claim 16 in which said power factor control means includes analog phase shifting means consisting of one or more comparators connected to receive both the sinusoidal feedback signals and the power factor command signal and being operable to generate inverter phase advance command pulses that are phase shifted relative to the zero-cross points of the sinusoidal feedback signals by an amount proportional to the level of the analog power factor command signal.

19. The induction motor drive as recited in claim 18 in which said analog phase shifting means also includes:

multiplexor means for successively gating the sinusoidal feedback signals in synchronism with the discrete phase advances of the alternating current applied to the motor by the inverter and generating a multiplexed waveform; and a single comparator coupled to the multiplexor means and being operable to generate the next inverter phase advance command pulse when the magnitude of the multiplexed waveform is equal to the magnitude of the analog power factor command signal.

20. The induction motor drive as recited in claim 16 in which the power factor control means also includes:
fixed low frequency oscillator means being operable to generate inverter phase advance command pulses whenever the sinusoidal feedback signals are insufficient to operate the power factor control means in a power factor control mode; and
automatic mode change means being operable to shift the power factor control means from power factor control mode to fixed low frequency mode.

21. The induction motor drive as recited in claim 20 in which the fixed low frequency oscillator means and the automatic mode change means consist of a resetable multivibrator connected to receive the inverter phase advance command pulses from the analog phase shifting means and being operable to generate supplemental inverter phase advance command pulses at a fixed low frequency whenever the received inverter phase advance command pulses are either non-existent or at too low a frequency.

22. The induction motor drive as recited in claim 16 in which the power factor command generating means includes:
means for sensing the magnitude of the magnetic flux in the motor;
means for determining the magnitude of the motor stator winding current; and
means for generating said power factor command signal responsive to the difference of the sensed magnetic flux and the sensed stator winding current such that the motor flux is controlled as a function of stator winding current magnitude.

23. The induction motor drive as recited in claim 22 in which said means for sensing the magnitude of the magnetic flux in the motor includes means for sensing each stator winding voltage, means for integrating the sensed stator winding voltages, and means for rectifying and summing the rectified integrated stator winding voltages.

24. The induction motor drive as recited in claim 22 in which said means for determining the magnitude of the motor stator winding current includes means coupled to the d.c. link for measuring the magnitude of the current flowing therethrough.

25. The induction motor drive as recited in claim 16 in which the current amplitude command generating means includes:
means for generating a speed command signal; means for sensing the motor electrical frequency and generating a speed feedback signal indicative of motor speed; and
means for generating said current amplitude command signal responsive to the difference of the speed command signal and the speed feedback signal such that the motor speed is controlled as commanded.

26. The induction motor drive as recited in claim 25 in which said means for sensing the motor electrical frequency includes means for averaging the inverter phase advance command pulses to produce a signal proportional to motor electrical frequency.

* * * * *